March 14, 1939. H. R. SCHUTZ 2,150,637
GATHERING RAM
Original Filed March 2, 1936 6 Sheets-Sheet 2
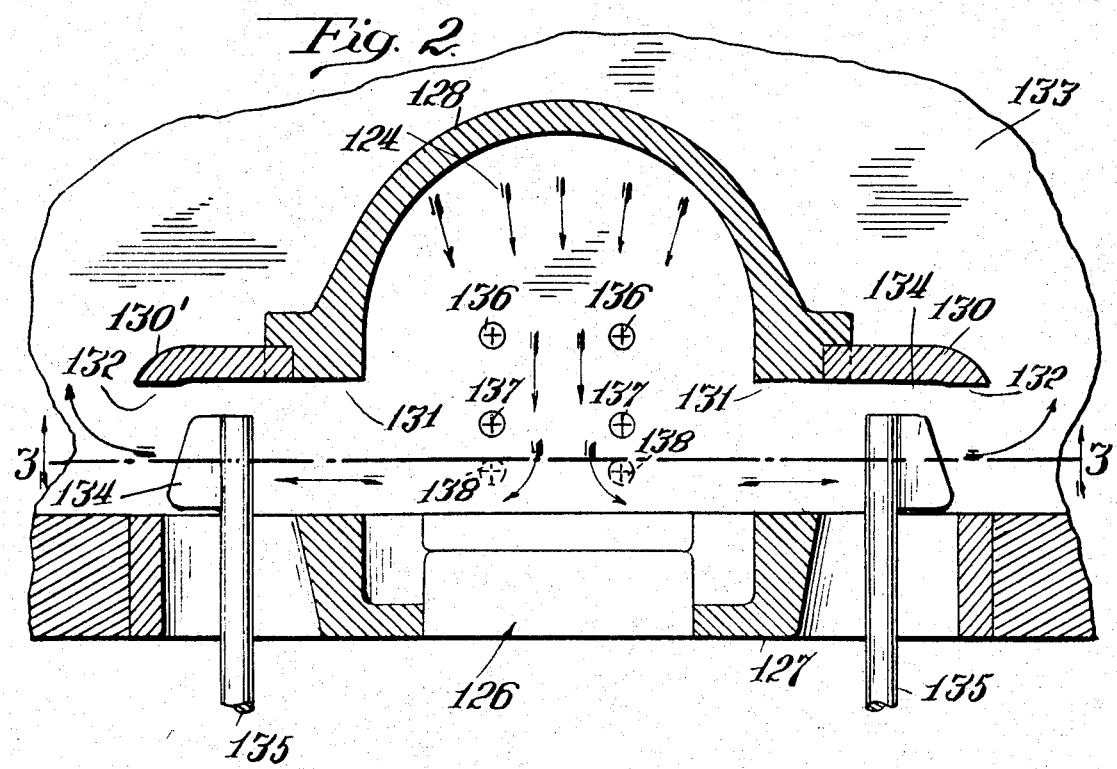
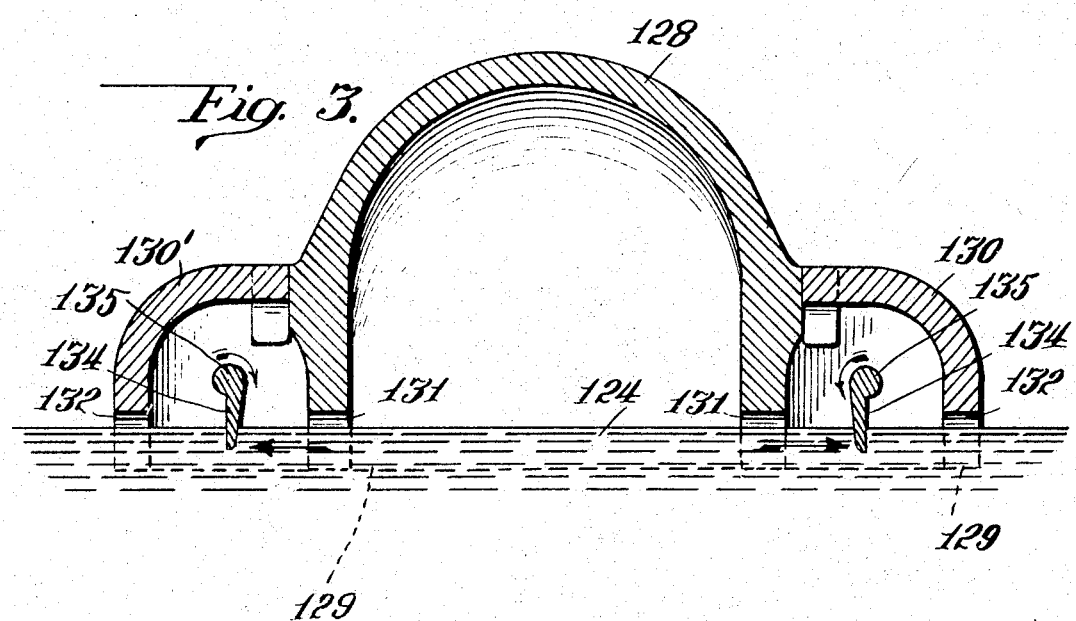
Inventor
Harold R. Schutz
By
Attorneys March 14, 1939.  H. R. SCHUTZ  2,150,637
GATHERING RAM
Original Filed March 2, 1936  6 Sheets-Sheet 3

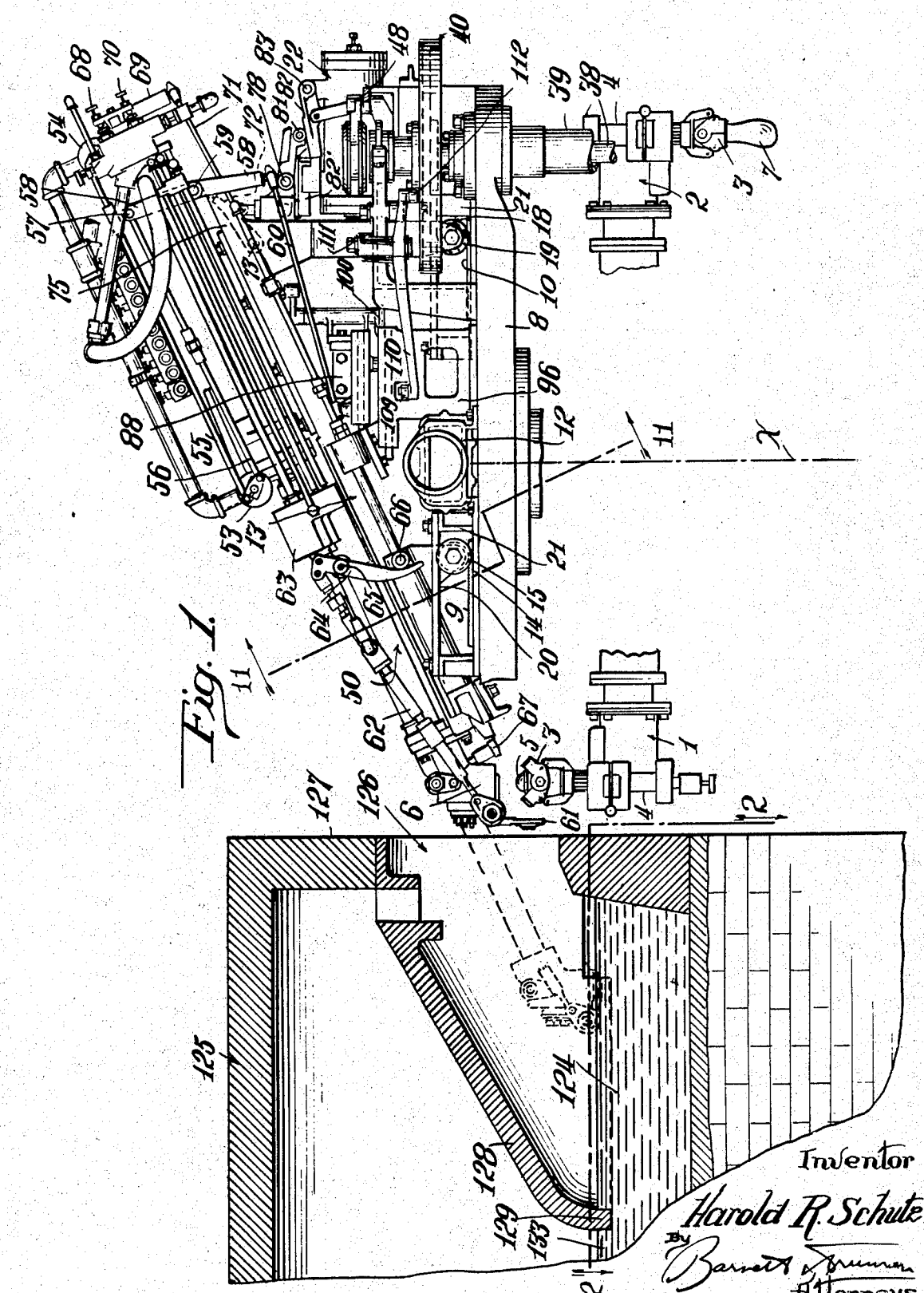

Inventor
Harold R. Schutz
By Barnett & Truman
Attorneys.

March 14, 1939.  H. R. SCHUTZ  2,150,637
GATHERING RAM
Original Filed March 2, 1936   6 Sheets-Sheet 4
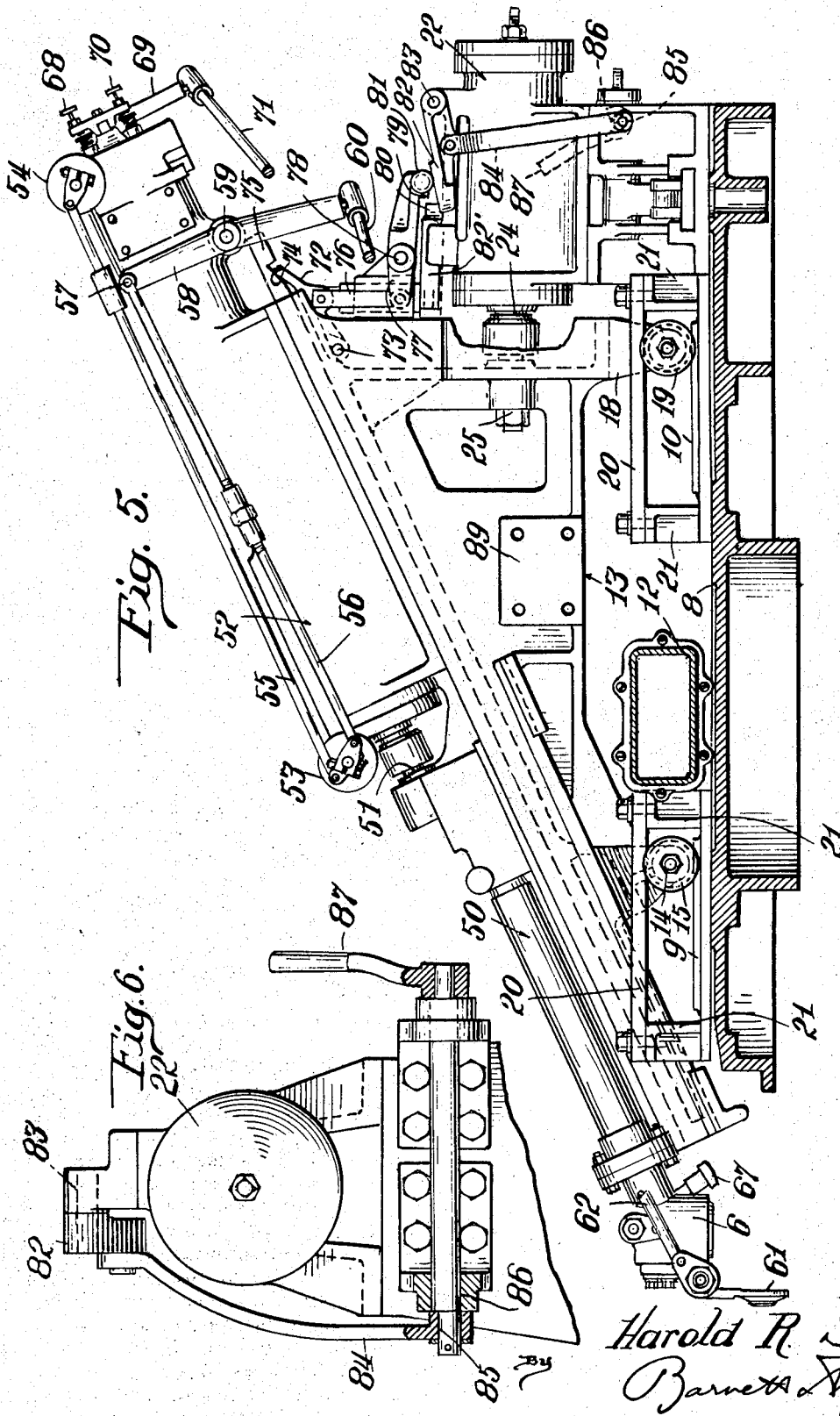
Inventor
Harold R. Schutz
By Barnett & Truman
Attorneys March 14, 1939.　　　　H. R. SCHUTZ　　　　2,150,637
GATHERING RAM
Original Filed March 2, 1936　　6 Sheets—Sheet 5
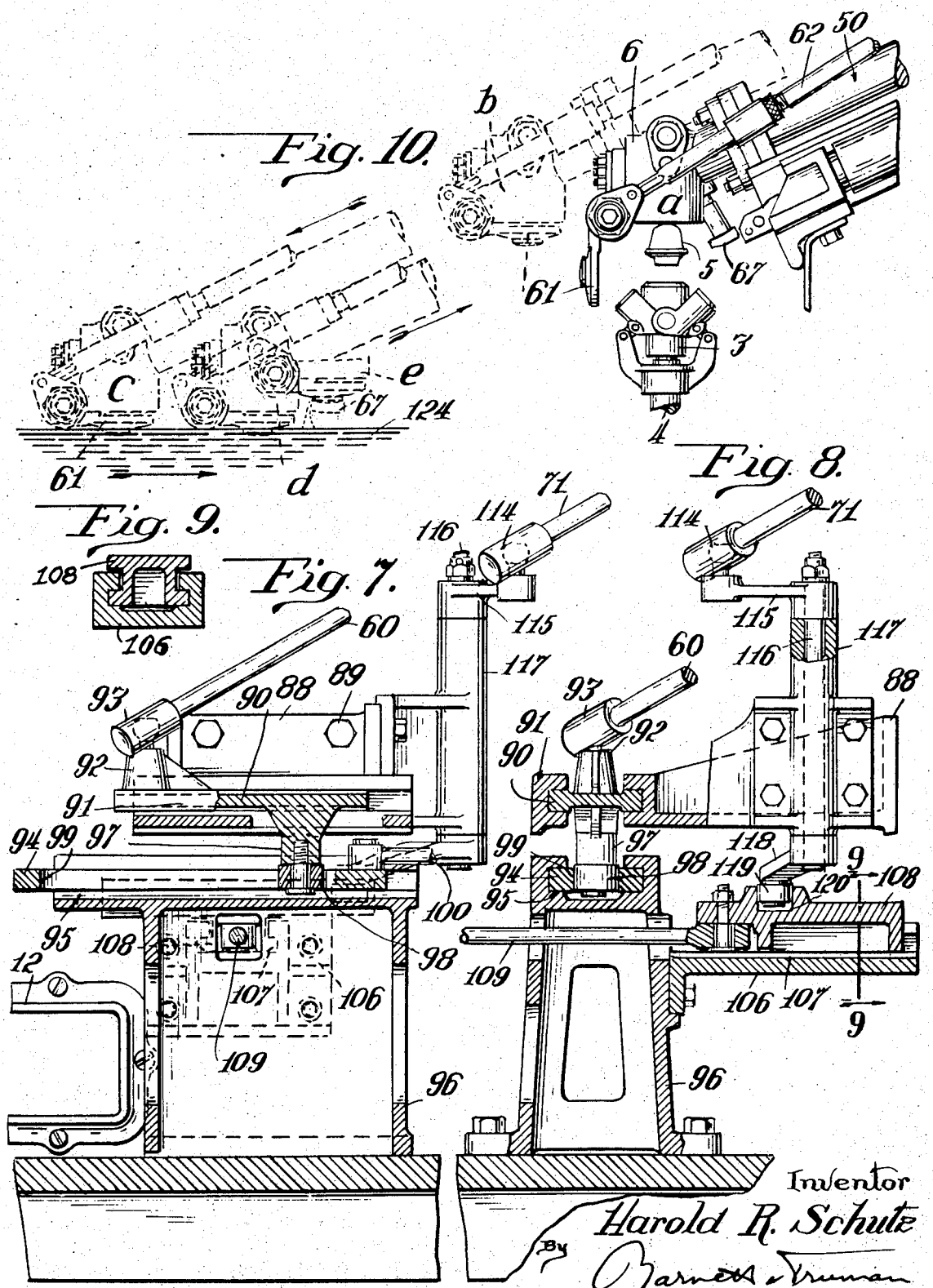

March 14, 1939. H. R. SCHUTZ 2,150,637
GATHERING RAM
Original Filed March 2, 1936  6 Sheets-Sheet 6
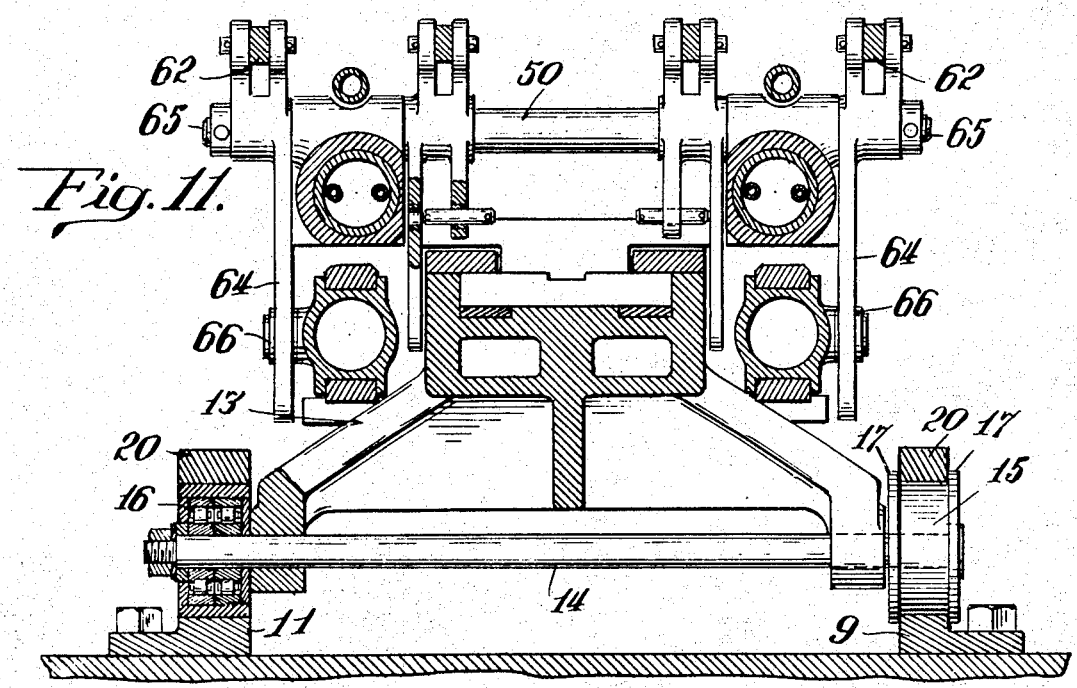
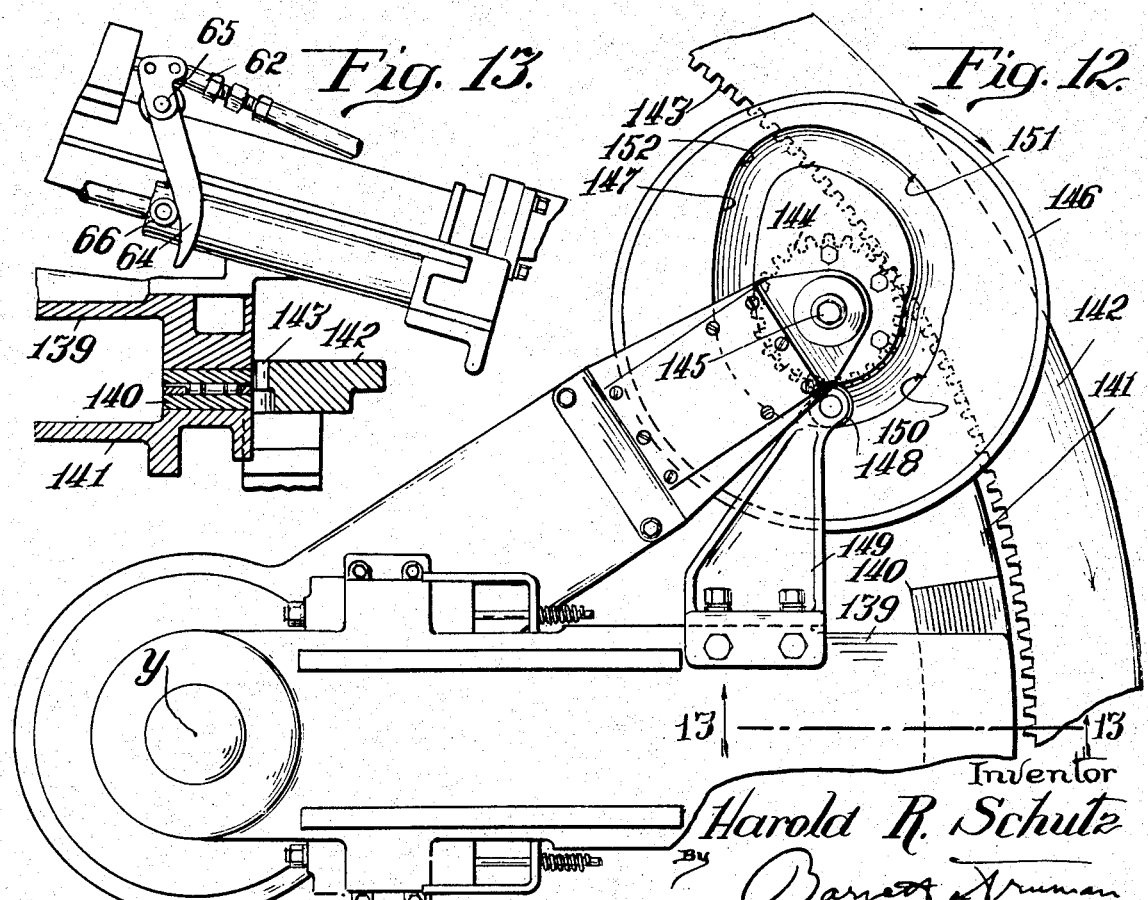
Inventor
Harold R. Schutz
By Barrett & Truman
Attorneys Patented Mar. 14, 1939

2,150,637

UNITED STATES PATENT OFFICE 2,150,637

GATHERING RAM

Harold R. Schutz, Ottawa Hills, Ohio, assignor to Libbey Glass Company, Toledo, Ohio, a corporation of Ohio Application March 2, 1936, Serial No. 66,635
Renewed May 31, 1938

19 Claims. (Cl. 49—62)

This invention relates to a new and improved gathering ram, or more particularly an improved device for gathering glass blanks from a pool of molten glass within a furnace and delivering these blanks to apparatus for shaping them into finished glass articles.

A gathering device of this general type is disclosed in the patent to Brown et al., 1,874,168, granted August 30, 1932. In this patented device, a gathering mold in which suction may be applied is carried at the lower end of a diagonally positioned ram operated by fluid pressure. This ram projects the gathering mold from an upper discharge position outside the furnace inwardly and downwardly to a gathering position in which the mold is in contact with the surface glass of the molten pool within the furnace. Suction is then exerted within the mold to draw molten glass into the mold, and the ram then operates to withdraw the mold along its original path to the upper discharge position outside the furnace. Soon after the mold has been lifted from the molten pool a knife operates to cut off the trailing glass which falls back into the pool. When the mold reaches its upper discharge position, outside the furnace, the mold opens and a puff of air is admitted to force the glass blank from the mold into a spindle positioned at this time beneath the mold. The cycle of operations of the ram is then repeated.

It will be noted that each contact of the metallic gathering mold with the molten glass tends to chill the remaining glass within the pool, and this gathering contact always takes place at the same spot within the pool. Furthermore, the trailing glass that is cut off from the gathered blank and which falls back into the pool tends to impair the quality of the remaining molten glass, and this glass should be carried away from the gathering position until it has been completely re-melted. For these reasons it is desirable to set up a flow of molten glass within the glass pool of the furnace so that fresh glass will always be presented to the gathering mold.

According to the present improvements, the gathering mold is projected further into the furnace than was formerly the case so that the mold enters the glass and gathers its charge at a location more remote from the front wall of the furnace. The mold is then withdrawn horizontally toward the front wall while still in contact with the molten glass thus creating a flow of molten glass in this direction. The mold with its charge is then withdrawn as before to the upper outer discharge position, the cut-off device operating to remove the trailing glass in the same manner as has been previously done. It will be noted that this cut-off glass is deposited in the pool at a point further removed from the gathering position, and a flow of the molten glass is set up in such a direction as to remove this trailing glass from the gathering position rather than permit it to flow thereto.

These added movements of the gathering device are accomplished by mounting the gathering ram on a carriage which is moved transversely, toward and from the furnace, in timed relation to the movements of the ram so that the mold travels through a closed path substantially in the form of a parallelogram having two long diagonal sides and two short horizontal sides. Improved means are provided for operating the ram and carriage and the valves which control the fluid pressure in properly timed relation to cause the mold to move and function in the proper manner.

The principal object of this invention is to provide an improved glass gathering device of the type briefly described hereinabove and disclosed more in detail in the specifications which follow.

Another object is to provide improved means for moving a gathering mold through an endless closed path during a portion of which travel the mold will be in contact with the molten glass of the pool.

Another object is to provide improved means for setting up a flow of molten glass within the furnace.

Other objects and advantages of this invention will be more apparent from the following detailed description of certain approved forms of apparatus constructed and operating according to the principles of the invention.

In the accompanying drawings:

Fig. 1 is a side elevation of the improved gathering ram and associated parts, a portion of the furnace being shown in vertical section, and parts of the glass-working machine on which the ram is mounted and with which the ram cooperates being indicated.

Fig. 2 is an enlarged horizontal section through a portion of the furnace, this view being taken substantially on a line 2—2 of Fig. 1.

Fig. 3 is a vertical section taken substantially on the line 3—3 of Fig. 2.

Fig. 5 is a side elevation of the ram and carriage with most of the control mechanism removed, the view being taken substantially on the line 5—5 of Fig. 4.

Fig. 6 is a detail end elevation, looking from the right at Fig. 5, and showing a portion of the locking mechanism.

Fig. 7 is a detail vertical section, on a larger scale, taken substantially on the line 7—' of Fig. 4.

Fig. 8 is a detail vertical section, on a larger scale, taken substantially on the line 8—8 of Fig. 4.

Fig. 9 is a detail vertical section taken substantially on the line 9—9 of Fig. 8.

Fig. 10 is a diagrammatic view illustrating the different operative positions of the gathering mold.

Fig. 11 is a transverse section, on a larger scale, taken substantially on the line 11—11 of Fig. 1.

Fig. 12 is a partial plan view showing mechanism for oscillating the ram and carriage assembly horizontally, when this improved gathering device is used in connection with a different type of glass-working machine.

Fig. 13 is a partial vertical section taken substantially on the line 13—13 of Fig. 12.

Figure 4:
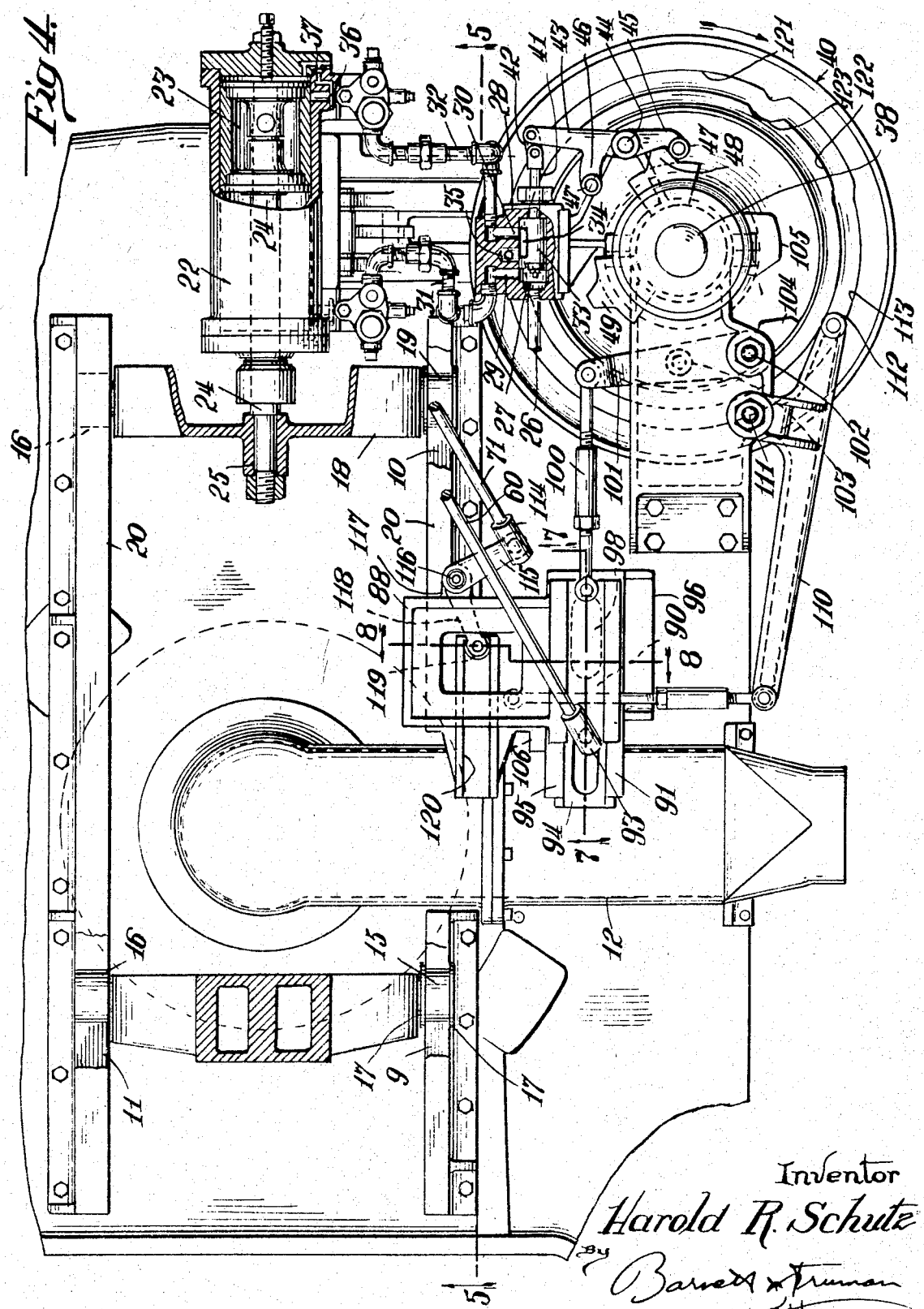
Fig. 4 is a plan view of the operating and controlling mechanism, with the ram and portions of the carriage removed to facilitate the disclosure.

Referring first to Figs. 1 to 11 inclusive, the improved gathering mechanism is shown as used with a glass-working machine of the type disclosed and claimed in the patent of this same inventor, 2,030,328, granted February 11, 1936. In a machine of this type a pair of similar glass-working heads 1 and 2 are independently oscillated about the central vertical axis $x$, through opposite angles of 180° each, from the glass working station at which the head 1 is now located to the blowing station at which the head 2 is now located. (Fig. 1.) When at the gathering station, the clamping jaws 3 at one end of spindle 4 will be turned upwardly so as to receive the glass blank 5 when this blank is dropped from the gathering mold 6 (which forms a portion of the gathering mechanism and will be hereinafter described more in detail). The head 1 now swings from the position shown in Fig. 1 to the position now occupied by the head 2, and during this movement the spindle 4 is inverted so that the glass blank will hang downwardly and by this time it will have been partially expanded into a hollow parison as indicated at 7. This parison is now enclosed in a finishing mold and blown to the desired form. The operation of this glass-working machine forms no part of the present invention and need not be further described. It is sufficient to note that in this type of machine the spindle which receives the glass blank is stationary at the time the blank is discharged thereto from the gathering mechanism so that it is unnecessary to provide any means for oscillating or moving the gathering mechanism horizontally while this transfer is taking place. Means for imparting this additional movement to the gathering device will be described hereinafter.

It might be here noted that in most types of glass-working machines with which this ram will be used the spindles 4 are arranged in pairs, the two spindles of each pair being operated simultaneously and carried through the same series of steps, simply for the purpose of doubling the capacity of the machine. Accordingly it is necessary to provide two gathering molds 6 which are positioned side by side and operated simultaneously by the same set of operating mechanisms. It is simpler to describe the machine and its operation as if there were only one gathering mold 6, and this procedure will be followed for the most part hereinafter.

On the top frame 8 of the glass-working machine are mounted three tracks 9, 10 and 11 (Figs. 1, 4, 5 and 11). The short tracks 9 and 10 are extensions of one another and arranged parallel to the single track 11. The two tracks 9 and 10 are used in order to provide room for the air-conduit 12 which forms a part of the glass-working machine. Were it not for this conduit, a single track similar to 11 could be substituted for the two tracks 9 and 10. The carriage indicated at 13 is provided with a front axle 14 on which are a pair of rollers 15 and 16 resting on the tracks 9 and 11 respectively. One of these rollers, such as 15, is provided with side flanges 17 to prevent the carriage from running off the tracks laterally. The rear legs 18 of the carriage are provided with rollers 19 which travel on the tracks 11 and 10. These rollers 19 may be similar to the front rollers 15 and 16. Guide rails 20 are supported above each of the tracks by end posts 21 so as to hold the carriage down on the tracks.

The carriage 13 is reciprocated back and forth along the trackways 9, 10 and 11 by means of a motor 22, here shown as a fluid-pressure cylinder having a piston 23 connected by a piston rod 24 with a portion of the carriage as indicated at 25. (See Fig. 4.) Fluid under pressure is delivered from a suitable source of supply through pipe 26 into the supply chamber 27 of the distributing valve indicated generally at 28. Supply ports 29 and 30 communicate with supply chamber 27, and pipe connections 31 and 32 extend respectively from these ports to the end portions of cylinder 22. The slide valve 33 movable in chamber 27 is adapted to alternatively cut off one of the ports 29 or 30 from the supply chamber and connect this port through passage 34 with the discharge vent opening 35. The supply pipes 31 and 32 connect through discharge ports (one of which is shown at 36) with the interior of cylinder 22 near the ends thereof. With the slide valve 33 in the position shown in Fig. 4, fluid pressure entering through pipe 26 will pass through port 29 and pipe connection 31 into the left-hand end of cylinder 22 and shift the piston 23 to the position shown in the drawing, thereby moving carriage 13 and parts carried thereby toward the right or away from the furnace. As the piston 23 nears the end of the cylinder it will close the main port 36 through which the fluid in this end of the cylinder has been flowing out through pipe connection 32 and vent 35. Thereafter the air or other fluid in this end of the cylinder will be trapped and can only flow out through the restricted passages indicated at 37, thus acting as a buffer or dash-pot to stop the moving parts at this end of their path of travel. A similar action takes place when valve 33 is shifted toward the left and the carriage is moved back toward the furnace.

At 38 (Figs. 1 and 4) is shown a vertical drive shaft that extends upwardly through one of the corner posts or standards 39 of the glass-working machine, this shaft being driven at its lower end from the machine so that the cam disk or holder 40 carried at the upper end of shaft 38 will be rotated in timed relation to the movements of the glass-working machine. The general cam assembly indicatetd at 40 operates several elements of the glass working machine, and also controls the movements of the gathering-ram and associated parts as will be hereinafter disclosed.

The slide valve 33 is connected through rod 41 and link 42 with one end of a lever 43 pivoted at 44 on a fixed frame member. This lever also comprises arms 45 and 46 which carry rollers 47 and 47' respectively. A pair of cams 48 and 49 adjustably carried by the cam assembly 40 are adapted to successively engage the rollers 47 and 47'. The cam assembly 40 rotates in a clockwise direction as seen in Fig. 4, and the cam 48 is about to engage the roller 47 and shift the slide valve 33 so that the carriage 13 will be moved toward the furnace. After a predetermined interval of time the cam 49 will engage the roller 47' and shift the valve back to the position shown in the drawings whereupon the carriage 13 will be returned away from the furnace to the position now shown.

The gathering-ram mechanism which is mounted on the carriage 13 is essentially the same as the mechanism disclosed in the Brown et al. patent hereinabove referred to, and is now well known in the art. The well-known features of this mechanism will, therefore, be only briefly described. A cross-head assembly 50 (see particularly Figs. 1, 5, 10 and 11) which carries the pair of gathering molds 6 and associated parts is shiftable along guides diagonally positioned on the carriage 13 so that the mold 6 will be reciprocated between the outer and upper discharge position shown in solid lines in Fig. 1 and the lower and inner gathering position with the molds in contact with the glass of the molten pool. The cross-head assembly is connected with piston rod 51 which extends to the piston within a fluid-pressure cylinder 52. Pressure fluid is admitted alternatively to the ends of cylinder 52 under the control of valves 53 and 54 which are connected by rod 55 so that the valves will be simultaneously shifted in opposite directions to admit pressure fluid to one end of the cylinder and exhaust the fluid from the other end. An operating rod 56 extending from one of the valves connects at 57 with one end of an operating lever 58 intermediately pivoted at 59. An operating rod 60 connects with the lower end of lever 58, this rod 60 being operated from the cam assembly 40 through connections that will be hereinafter described.

The gathering mold 6 is formed with a suitable cavity into which the molten glass is drawn, this cavity being open at the bottom but normally closed by the swinging closure plate 61. This closure is held in the closed position shown at the left of Fig. 10 by an operating rod 62 extending from the pressure cylinder 63. However, as the mold reaches the upper or discharge end of its path of travel, a lever 64 pivoted on the cross-head at 65 and connected at its upper end with operating rod 62 engages at its lower end with a fixed stop 66 thereby swinging the closure 61 downwardly to the position shown in solid lines in Fig. 1 to permit the discharge of the glass blank 5. As the mold 6 starts to move downwardly into the furnace and the lever 64 moves away from the stop 65, the pressure cylinder 63 will immediately close the swinging closure 61 and hold it in this position until the mold again returns to the discharge position. It will be understood that the closure 61 is provided with a central opening through which molten glass is drawn up into the mold when suction is applied. A swinging knife or cut-off device indicated at 67 is adapted to move beneath the opening in closure 61 and cut-off the trailing glass shortly after the gathering mold rises from the molten pool, as will be hereinafter referred to. The action of cut-off device 67 is brought about at a predetermined point in the upward path of travel of the mold by the engagement of fixed and moving members, similar to the operation of the closure. Such elements as the closure and cut-off device, which are operated by the reciprocations of the cross-head do not require any change over the constructions now known and disclosed in the Brown patent. However, those mechanisms which are controlled from the cam assembly 40, which does not reciprocate with the carriage 13 and parts carried thereby, have been provided with novel operating connections to permit these relative movements. These connections will be hereinafter described in detail.

It will be understood that the molds 6 and those parts of the apparatus that are brought into the furnace or in close proximity to the molten glass are internally water-cooled. The provisions for water-cooling the parts are well known and need not be here described.

When the mold 6 has been brought into engagement with the surface glass of the molten pool, the cavity within the mold must be connected with an exhausting means so as to withdraw the air and permit the mold to be filled with molten glass. This vacuum connection is controlled by a valve 68 supported at the upper end of cylinder 52 and operated by an intermediately pivoted lever 69 (see Figs. 1 and 5). When the mold 6 is raised to the discharge position shown in Fig. 1, a puff of air under pressure is admitted to the mold to assist in discharging the glass blank 5. This air presure is controlled by a second valve 70 operated by lever 69 when swung in the opposite direction. The movements of lever 69 are controlled by an operating rod 71, as hereinafter described.

A suitable locking mechanism (Figs. 1, 5 and 6) is provided for positively holding the ram and carriage in their withdrawn positions, if so desired. A locking lever 72 is pivoted at 73 in the carriage frame 13, and when elevated is adapted to engage in a notch 74 in a slide member 75 extending rearwardly from the cross-head 50. A link 76 connects locking lever 72 with one end of a lever 77 pivoted intermediately at 78 on the carriage. The other end of lever 77 carries a downwardly projecting locking hook 79 adapted to engage a fixed lug 80 and prevent movement of carriage 13 toward the furnace. A roller 81 on the outer end of lever 77 rests on a track section 82 which is pivoted at 83 and connected through link 84 with an eccentric 85 on a cross-shaft 86. A hand lever 87 on the opposite end of this shaft (Fig. 6) is adapted to turn the eccentric so as to move the track section 82 from the position shown in Fig. 5 to an upper position in which it aligns with a fixed track section 82'. When the machine is in normal operation, the hand lever 87 is moved in such a direction as to elevate the track section 82 and lift the roller 81. The roller 81 will now run back and forth along the aligned track sections 82 and 82' as carriage 13 is reciprocated. This movement of lever 77 will pull down on link 76 and release the locking lever 72 so that the ram may reciprocate cross-head 50. When hand lever 87 is thrown in the opposite direction so as to lower the track section 82, the hook 79 will fall into engagement with fixed lug 80 thus locking the carriage against movement and at the same time the locking lever 72 will be moved up into notch 74 so as to lock the ram.

The cam-operated mechanism for moving the several valves on the ram and carriage will now be described (referring more particularly to Figs. 4, 5, 7, 8 and 9). A supporting bracket 88 is fixed at 89 on one side of carriage 13, and a slide member 90 is mounted in a slideway 91 in the outer end portion of this bracket. A post 92 on the upper face of slide 90 has a swivel connection at 93 with the lower end of the operating rod 60 which controls the movements of ram operating lever 58, and hence the reciprocations of the cross-head 50. A second slide 94, positioned beneath the first mentioned slide 90, is mounted in slideway 95 in the fixed bracket or standard 96. A post or stud 97 projecting downwardly from the upper slide 90 carries a roller 98 which engages in a slot 99 extending longitudinally in the lower slide 94. Lower slide 94 is connected through operating link 100 with one end of a lever 101 fulcrumed at the other end 102 in a fixed frame member. A roller 103 on lever 101 is adapted to be successively engaged by a pair of cams 104 and 105 carried by the cam disk 40. The swinging movements of lever 101 imparted by the engagement of cams 104 and 105 with roller 103 will shift the slide 94 longitudinally in one direction or the other through a short distance.

As the carriage 13 moves back and forth through its horizontal path of travel, the bracket 88, slide 90, roller 98 and link 60 will move with the carriage without any movements being imparted to the link 60 so as to swing the operating lever 58. The roller 98 will simply travel from one end to the other of the slot 99 in slide 94. However, when the cross-head and gathering molds have been retracted to the upper position shown in the drawing, the roller 98 will have moved to the right-hand end of the slot 99 (Fig. 7). Now rotating cam 48 will first engage the roller 47 and cause the carriage 13 to be shifted toward the furnace so that roller 98 on slide 90 will move to the other end of slot 99. Soon thereafter the rotating cam 104 will engage the roller 103 and shift the lower slide 94 toward the right (Fig. 7) thus moving roller 98 and slide 90 and shifting operating lever 60 so as to swing the lever 58 and operate the valves 53 and 54. As a consequence the gathering molds will be moved downwardly into the furnace. After the blank has been gathered, cam 49 will engage roller 47' and as a result the carriage will be shifted back to the position shown in the drawing thus causing the movement of the molds when in contact with the molten pool, as hereinafter described. Immediately thereafter the cam 105 will engage the roller 103 and shift the slide 94 toward the left (Fig. 7). In the meantime roller 98 has been moved to the right-hand end of slot 99 by the last mentioned movement of the carriage so that when slide 94 is shifted to the left roller 98 will also be pushed in this direction and will operate link 60 to reverse the positions of valves 53 and 54 and cause the molds 6 to be withdrawn from the furnace.

The fixed standard 96 carries a bracket 106 projecting toward the carriage 13 and formed with a guideway 107 in which a slide 108 moves. This slide is connected through link 109 with one end of a lever 110 pivoted in the fixed frame at 111 and carrying on its other arm a roller 112 which engages in a cam slot 113 in the upper surface of cam disk 40.

The operating rod 71 which extends from the lever 69 which controls the vacuum and air connections to the gathering mold has a swivel connection at its lower end 114 with the lever arm 115 secured on the upper end of a vertical shaft 116 journaled in a bracket 117 on the carriage. A crank arm 118 on the lower end of shaft 116 carries a roller 119 adapted to move in a slot 120 formed in the upper surface of slide 108 transversely to the direction of movement of this slide (see Figs. 4 and 8). It will now be seen that as the carriage moves back and forth the roller 119 will simply slide longitudinally in slot 120 without imparting any movement to the operating rod 71. However, if at any time the slide 108 is moved longitudinally of its slideway 107, a swinging movement will be imparted to crank arm 118 and thence through the link and lever connections described above the operating rod 71 and lever 69 will be operated to operate the valves 68 or 70 and connect either vacuum or air with the interior of the gathering mold. As long as roller 112 is in the neutral portion 121 of cam path 113, both valves 68 and 70 will be closed. When roller 112 moves into the section 122 of the cam path, the valve 68 will be opened to make vacuum connections with the interior of the mold, this suction being maintained until the roller 112 passes into the portion 123 of the cam path, at which time the suction will be cut off and a puff of air will be directed into the mold to blow out the glass blank 5. Obviously the cam path 113 may be made adjustable so as to change the relative positioning of the cam sections on disk 40 and the length of time that the vacuum is applied.

A complete cycle of operations will now be described, referring more particularly to Fig. 10 in which successive positions of the gathering mold 6 are indicated at a, b, c, d and e respectively. We will assume that mold 6 is now in the position shown in solid lines in Fig. 10 at a. The carriage 13 will first be operated to shift the entire ram mechanism, and consequently the mold 6, forwardly to the position indicated at b. Immediately thereafter the ram cross-head will be projected downwardly and inwardly so as to carry the mold from the position shown at b to the position shown at c. As this movement starts, the closure 61 will be swung up to closed position, and immediately after the mold has come in contact with the surface of the glass pool 124 as shown at c, the valve 68 will be operated to apply suction within the mold and draw a charge of molten glass from pool 124. The carriage 13 will now be retracted to draw the entire ram mechanism away from the furnace, and this will cause mold 6 to move from the position c to the position d. During this movement the lower portion of the mold is still in contact with the molten glass in the pool, and this will set up a flow of glass within the molten pool in the direction of the arrow (Fig. 10). After the mold has reached the position d, the ram will be operated to withdraw the mold along its upward and outward path and as the mold reaches the position indicated at e the cut-off knife 67 will be operated to separate the trailing glass from the charge in the mold, this trailing glass dropping back into pool 124. As mold 6 reaches the original position a, the closure 61 will be swung open and a puff of air will be applied to blow out the blank 5 which will drop into engagement with the spindle 4 as shown in Fig. 10. This cycle of events will now be repeated.

Referring now to Figs. 1, 2 and 3, the furnace indicated generally at 125 has an opening 126 in its front wall 127, from which opening a boot 128 projects inwardly and downwardly and in some locations below the surface of the molten glass as indicated at 129, so as to partially segregate the pool of molten glass 124 from which the blanks are drawn. The boot 128 has side extensions 130 and 130' each formed with passages 131 and 132 through which glass from pool 124 can flow outwardly adjacent the wall 127 of the furnace, back into the main body of glass 133 within the furnace. This circulation of glass is accelerated by a pair of rotary propellers 134 carried by shafts 135 and driven in any suitable manner from outside the furnace. These propellers and their supporting shafts are water-cooled in well-known manner. Since glass is withdrawn from pool 124 to form the blank, and glass is also being circulated outwardly from the pool through passages 131 and 132, there will be an upward flow of glass from the central portion of the furnace under the submerged portion 129 of the boot to replace this withdrawn glass. The boot 129 will act as a skimmer to prevent surface impurities from entering the molten pool.

At 136 (Fig. 2) are indicated the positions at which the gathering molds 6 first contact with the molten pool, the blanks being withdrawn from the pool at these positions. The molds are then moved while still in contact with the glass to the positions 137, that is toward the front wall 127 of the furnace, thus helping to create a forward flow of glass within the pool. The molds commence to rise upwardly and outwardly from the pool and when they have reached positions over the points 138 the cut-off knives 67 are operated to cause the trailing glass to drop back into the pool. It will now be noted that this trailing glass is dropped back into the pool at quite a distance from the positions 136 at which the glass blanks are drawn, and the circulation created within the pool causes this cut-off glass to flow outwardly adjacent the front wall and back into the main body of glass 133 in the furnace where this cut-off glass becomes thoroughly re-melted.

The gathering mechanism as thus far described is adapted for cooperation with any glass working machine in which the spindles or parts to which the blanks are to be delivered are stationary at the time the transfer is made. In another type of glass-working machine now in common use the spindles revolve continuously through a large circular orbit and the blanks must be transferred to these moving spindles. In order to accomplish this, the entire ram assembly may be oscillated horizontally, while the transfer is being made, as disclosed in the Brown patent hereinabove referred to. For example, as shown in Figs. 12 and 13 of this application, the entire assembly as hereinabove described may be mounted on a platform 139 which is pivoted about the central axis $y$ of the glass-working machine. It will be understood that the tracks which carry the carriage 13 are mounted on platform 139, or some part carried thereby. The outer end of platform 139 is movable on the arcuate trackway 140 formed on supporting frame 141 of the machine. At 142 is indicated an arcuate or annular plate which moves with the rotary portion of the glass-working machine, this plate being formed with an internal gear 143 which meshes with a gear 144 journaled about a fixed pivot 145 and rotating the cam disk 146. This cam disk is formed with a box cam indicated generally at 147 in which is movable roller 148 carried by arm 149 projecting laterally from supporting platform 139. As long as roller 148 is in the concentric portion 150 of the cam slot, the platform 139 will not move and it is during this time that the glass-gathering operations hereinabove described take place. As the roller 148 enters the eccentric portion 151 of the cam slot the platform 139 will be swung about the pivot $y$ (in a clockwise direction) synchronously with the movement of the rotary glass working elements so that the molds 6 will be traveling above the moving spindles 4 when the transfer of the blank is made. Immediately thereafter the roller 148 enters the eccentric portion 152 of the cam slot and the platform 139 and all of the mechanism carried thereby is quickly shifted back to the original position after which another blank-gathering operation is performed.

Since the lateral swinging movements of the ram take place while the ram is entirely withdrawn from the furnace, the width of furnace opening 126 need not be increased to provide for this swinging movement. Furthermore, the placing of propellers 134 in separate housings 130 and 130' permits the width of boot 128, and of opening 126, to be held to a minimum just sufficient to permit the in and out reciprocating movements of the ram. In this way the area of the exposed glass and consequently the chill to which the molten glass is subjected, is minimized.

I claim:

1. In combination with a furnace containing a pool of molten glass, the furnace having an inlet opening in the front wall thereof, a machine for drawing glass blanks comprising a gathering mold, means for drawing into and expelling a charge of glass from the mold, and means for moving the mold through a closed path in a substantially vertical plane which includes projecting the mold into the furnace through the inlet opening and into drawing engagement with the glass of the pool at a position remote from the inlet opening, then moving the mold horizontally toward the front wall of the furnace while still in glass-drawing position and then withdrawing the mold from the furnace.

2. In a machine for gathering glass blanks from a pool of molten glass within a furnace, a gathering mold, means for drawing into and expelling a charge of glass from said mold, a ram mechanism for reciprocating the mold between an upper outer discharge position and an inner lower drawing position with the mold in engagement with the glass of the pool, a carriage on which the ram mechanism is mounted, a support for the carriage, means for reciprocating the carriage horizontally toward and from the furnace, and means for so timing the movements of the ram and carriage that the mold will be successively shifted inwardly toward the pool, then inwardly and downwardly into drawing position, then horizontally outwardly through the molten glass and then upwardly and outwardly to discharge position.

3. In a machine for gathering glass blanks from a pool of molten glass within a furnace, a gathering mold, means for drawing into and expelling a charge of glass from said mold, a ram mechanism for reciprocating the mold between an upper outer discharge position and an inner lower drawing position with the mold in engagement with the glass of the pool, a carriage on which the ram mechanism is mounted, a fluid pressure cylinder on the carriage for reciprocating the ram, a support for the carriage, a fluid pressure cylinder on the support for reciprocating the carriage horizontally toward and from the furnace, valve mechanisms for selectively admitting pressure fluid to the respective ends of the cylinders, and timing mechanism controlling the valves so that the cylinders will be alternately actuated to project the mold inwardly toward the furnace, then downwardly into glass-drawing position, then horizontally outwardly through the molten glass, and then upwardly and outwardly to discharge position.

4. In a machine for gathering glass blanks from a pool of molten glass within a furnace, a gathering mold, means for drawing into and expelling a charge of glass from said mold, a ram mechanism for reciprocating the mold between an upper outer discharge position and an inner lower drawing position with the mold in engagement with the glass of the pool, a carriage on which the ram mechanism is mounted, a fluid pressure cylinder on the carriage for reciprocating the ram, a support for the carriage, a fluid pressure cylinder on the support for reciprocating the carriage horizontally toward and from the furnace, valve mechanisms for selectively admitting pressure fluid to the respective ends of the cylinders, a rotary cam assembly, and connections between the cams and valves for operating the valves in timed relation to one another, so that the mold will be successively shifted inwardly toward the furnace, then downwardly into glass-drawing position, then horizontally outward through the molten glass, and then upwardly and outwardly to discharge position.

5. In combination, a machine for gathering glass blanks from a pool of molten glass within a furnace, a gathering mold, means for drawing into and expelling a charge of glass from said mold, a ram mechanism for reciprocating the mold between an upper outer discharge position and an inner lower drawing position with the mold in engagement with the glass of the pool, a carriage on which the ram mechanism is mounted, a continuously rotary glass-working machine comprising a fixed supporting frame, a supporting plate oscillatable on said frame about the center of rotation of the glass-working machine, the carriage being mounted on the plate for reciprocation radially of the center of rotation toward and from the furnace, and means for so timing the movements of the ram, carriage and supporting plate that the mold will be successively moved into the furnace into drawing engagement with the pool, then moved horizontally while within the furnace and in engagement with the glass, then withdrawn from the furnace, and then oscillated about the center of rotation so as to travel for a time with the glass working machine.

6. In a machine for gathering glass blanks from a pool of molten glass within a furnace, a gathering mold, fluid pressure means for drawing into and expelling a charge of glass from the mold, valve means for controlling the last mentioned means, a ram mechanism for reciprocating the mold between an upper outer discharge position and an inner lower drawing position with the mold in engagement with the glass of the pool, a carriage on which the ram mechanism is mounted, a fluid pressure cylinder on the carriage for reciprocating the ram, a support for the carriage, a fluid pressure cylinder on the support for reciprocating the carriage horizontally toward and from the furnace, valve mechanisms for selectively admitting pressure fluid to the respective ends of the cylinders, and timing mechanism controlling the several valves so that the mold will be successively projected inwardly toward the furnace and downwardly into gathering engagement with the glass pool, a charge of glass will be drawn into the mold, the mold will be withdrawn horizontally while within the furnace and in glass-drawing position, the mold will then be withdrawn upwardly and outwardly from the furnace, and the glass blank will be expelled from the mold.

7. In a machine for gathering glass blanks from a pool of molten glass within a furnace, a gathering mold, fluid pressure means for drawing into and expelling a charge of glass from the mold, valve means for controlling the last mentioned means, a ram mechanism for reciprocating the mold between an upper outer discharge position and an inner lower drawing position with the mold in engagement with the glass of the pool, a carriage on which the ram mechanism is mounted, a fluid pressure cylinder on the carriage for reciprocating the ram, a support for the carriage, a fluid pressure cylinder on the support for reciprocating the carriage horizontally toward and from the furnace, valve mechanism for selectively admitting pressure fluid to the respective ends of the cylinders, a rotary cam assembly, and connections between the cams and the several valves so that the mold will be successively projected inwardly toward the furnace and downwardly into gathering engagement with the glass pool, a charge of glass will be drawn into the mold, the mold will be withdrawn horizontally while within the furnace and in glass-drawing position, the mold will then be withdrawn upwardly and outwardly from the furnace, and the glass blank will be expelled from the mold.

8. In combination with a furnace containing molten glass, the furnace having an inlet opening in the front wall thereof above the glass level, means for partially segregating a molten pool of glass adjacent the inlet opening, means for causing the molten glass adjacent the front wall to flow laterally from the pool, a machine for gathering glass blanks comprising a gathering mold, means for projecting the mold into the furnace through the inlet opening and into engagement with the glass of the pool at a location remote from the front wall, and means for withdrawing the mold horizontally while in glass-drawing position to cause a flow of glass within the pool toward the front wall.

9. In combination with a furnace containing molten glass, the furnace having an inlet opening in the front wall thereof above the glass level, means for partially segregating a molten pool of glass adjacent the inlet opening, mechanically moved propellers positioned adjacent the sides of the pool for causing the molten glass adjacent the front wall to flow laterally from the pool, a machine for gathering glass blanks comprising a gathering mold, means for projecting the mold into the furnace through the inlet opening and into engagement with the glass of the pool at a location remote from the front wall, and means for withdrawing the mold horizontally while in glass-drawing position to cause a flow of glass within the pool toward the front wall.

10. In combination with a furnace containing a pool of molten glass, the furnace having an inlet opening in the front wall thereof, a machine for forming glass articles comprising a plurality of glass-working spindles movable into and out of position adjacent said inlet opening, a gathering mold, means for drawing into and expelling a charge of glass from the mold, and means for moving the mold through the inlet opening from an upper discharge position above one of the spindles to an inner lower drawing position in engagement with the molten glass and then returning the mold to the discharge position, said moving means comprising means for reciprocating the mold inwardly and downwardly and then upwardly and outwardly, and other means for reciprocating the mold horizontally, the movements of said two reciprocating means and said glass-drawing means being so timed that the mold will be withdrawn horizontally toward the front wall of the furnace for a distance while still in engagement with the glass of the pool after the charge of glass has been drawn into the mold.

11. In combination with a furnace containing a pool of molten glass, the furnace having an inlet opening in the front wall thereof, a machine for forming glass articles comprising a plurality of glass-working spindles movable continuously throughout a circular path a portion of which is adjacent the inlet opening, a gathering mold, means for drawing into and expelling a charge of glass from the mold, means for reciprocating the mold inwardly and downwardly and then upwardly and outwardly, means for reciprocating the mold horizontally, and means for swinging the mold through a horizontal arc above the path of travel of the spindles, the several moving means and the glass-drawing means being so timed that the mold will be projected through the inlet opening into the furnace and into drawing engagement with the glass of the pool, a charge of glass will be drawn into the mold, the mold will then be withdrawn horizontally toward the front wall of the furnace while still in engagement with the molten glass, then withdrawn from the pool to the starting position above the path of travel of the spindles, then swung horizontally above and in synchronism with a spindle while a glass blank is being transferred from the mold to the spindle, and then swung back to the starting position.

12. In combination with a furnace containing molten glass, the furnace having an inlet opening in the front wall thereof, a boot extending inwardly and downwardly from around the inlet opening so as to partially segregate a pool of molten glass adjacent the inlet opening, mechanically moved propellers for causing the molten glass adjacent the front wall to flow laterally from the pool, a machine for forming glass articles comprising a plurality of glass-working spindles movable into and out of position adjacent the inlet opening, a gathering mold, means for drawing into and expelling a charge of glass from the mold, means for moving the mold through the inlet opening from an outer upper discharge position above one of the spindles to an inner lower drawing position within the boot and in engagement with the molten glass of the pool and then returning the mold to the discharge position, and means for moving the mold toward the front wall of the furnace while in glass-drawing position, during the first portion of the return movement so as to cause a flow of molten glass toward the front wall of the furnace.

13. In combination with a furnace containing molten glass, the furnace having an inlet opening in the front wall thereof, a boot extending inwardly and downwardly from around the inlet opening so as to partially segregate a pool of molten glass adjacent the inlet opening mechanically moved propellers for causing the molten glass adjacent the front wall to flow laterally from the pool, a machine for forming glass articles comprising a plurality of glass-working spindles movable continuously throughout a circular path a portion of which is adjacent the inlet opening, a gathering mold, means for drawing into and expelling a charge of glass from the mold, means for reciprocating the mold inwardly and downwardly and then upwardly and outwardly, means for reciprocating the mold horizontally toward and from the front wall of the furnace, and means for swinging the mold through a horizontal arc above the path of travel of the spindles, the several mold-moving means being so timed that the mold will be successively projected through the inlet opening into the furnace and into drawing engagement with the glass of the pool, then withdrawn horizontally toward the front wall while in glass-drawing position so as to cause a flow of molten glass toward the front wall, then withdrawn from the pool to the starting position above the path of travel of the spindles, then swung horizontally above and in synchronism with a spindle while a glass blank is being transferred from the mold to the spindle, and then swung back to the starting position.

14. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run extending backwardly toward the supporting frame, said mechanism comprising a carriage movably mounted on the frame, means for reciprocating the carriage horizontally in the vertical plane of the path, a ram mounted on the carriage and supporting the mold, means for reciprocating the ram in the vertical plane of the path between an upper and a lower position, and means for timing the reciprocations of the ram and carriage alternately.

15. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run, said mechanism comprising a carriage movably mounted on the frame, means for reciprocating the carriage horizontally in the vertical plane of the path, a ram mounted on the carriage and supporting the mold, means for reciprocating the ram in the vertical plane of the path between an upper and a lower position, and means for timing the reciprocations of the ram and carriage alternately.

16. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run extending backwardly toward the supporting frame, said mechanism comprising a carriage movably mounted on the frame, means for reciprocating the carriage horizontally in the vertical plane of the path, a ram mounted on the carriage and supporting the mold, means for reciprocating the ram in the vertical plane of the path outwardly and downwardly and then inwardly and upwardly between an upper and a lower position, and means for timing the movements of the ram and carriage alternately.

17. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run, said mechanism comprising a carriage movably mounted on the frame, means for reciprocating the carriage horizontally in the vertical plane of the path, a ram mounted on the carriage and supporting the mold, means for reciprocating the ram in the vertical plane of the path outwardly and downwardly and then inwardly and upwardly between an upper and a lower position, and means for timing the movements of the ram and carriage alternately.

18. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run extending backwardly toward the supporting frame, said mechanism comprising a carriage movably mounted on the frame, means for reciprocating the carriage horizontally in the vertical plane of the path, a ram mounted on the carriage and supporting the mold, means for reciprocating the ram in the vertical plane of the path between an upper and a lower position, and means for causing alternate actuations of the respective means for reciprocating the carriage and ram in such order that the carriage will first be shifted outwardly, then the ram will be shifted downwardly, then the carriage will be withdrawn toward the frame and then the ram will be withdrawn upwardly.

19. In a machine for gathering glass blanks from a pool of molten glass within a furnace, a gathering mold, means for drawing into and expelling a charge of glass from said mold, a fixed supporting frame, and mechanism for moving said mold through a closed path in a vertical plane, said path including a lower horizontal run extending backwardly toward the supporting frame, said mechanism comprising a carriage movably mounted on the frame, means for reciprocating the carriage horizontally in the vertical plane of the path, a ram mounted on the carriage and supporting the mold, means for reciprocating the ram in the vertical plane of the path outwardly and downwardly and then inwardly and upwardly between an upper and a lower position, and means for causing alternate actuations of the respective means for reciprocating the carriage and ram in such order that the carriage will first be shifted outwardly, then the ram will be shifted outwardly and downwardly, then the carriage will be withdrawn toward the frame and then the ram will be withdrawn upwardly and toward the frame.

HAROLD R. SCHUTZ.